US006589683B2

(12) United States Patent
Staats, III

(10) Patent No.: US 6,589,683 B2
(45) Date of Patent: Jul. 8, 2003

(54) REGENERATIVE FUEL CELL LEARNING KIT

(76) Inventor: Robert V. Staats, III, 486 Flower St., Costa Mesa, CA (US) 92627

( * ) Notice: Subject to any disclaimer, the term of this patent is extended or adjusted under 35 U.S.C. 154(b) by 226 days.

(21) Appl. No.: 09/826,159

(22) Filed: Apr. 3, 2001

(65) Prior Publication Data

US 2002/0025467 A1 Feb. 28, 2002

Related U.S. Application Data

(60) Provisional application No. 60/194,639, filed on Apr. 4, 2000.

(51) Int. Cl.[7] .................. H01M 2/02; H01M 2/06; H01M 2/10; H01M 2/12; G09B 23/18
(52) U.S. Cl. .................. 429/34; 434/379; 434/301; 429/9; 429/35; 429/55; 429/56; 429/97
(58) Field of Search .................. 429/9, 12, 21, 429/30, 34, 35, 37, 53, 55, 56, 97, 100, 123; 434/379, 301, 276

(56) References Cited

FOREIGN PATENT DOCUMENTS

JP            2002-75415      *  3/2002

OTHER PUBLICATIONS

Internet Printout. Fuel Cell: Car & Exmperiment Kit, http://www. thamesandkosmos.com. No date.*
Internet Printout. The Fuel Cell Store offers model and remote control fuel cell cars. http://www.fuelcellstore.com. No date.*

* cited by examiner

Primary Examiner—Patrick Ryan
Assistant Examiner—Tracy Dove
(74) Attorney, Agent, or Firm—Leonard Tachner

(57) ABSTRACT

Educational kit which combines a unitized regenerative fuel cell with a demonstration platform to illustrate the principals of fuel cell use and application. A fuel cell education kit provides valuable exposure to the principals of fuel cell generated electricity to children. The fuel cell is a regenerative fuel cell converting water into hydrogen and oxygen during a charging cycle and reversing the process during discharge. A proton exchange membrane drives the process.

15 Claims, 4 Drawing Sheets

REGENERATIVE FUEL CELL LEARNING KIT

This Application claims benefit of provisional App. 60/194,639, filed Apr. 4, 2000.

BACKGROUND OF THE INVENTION

1. Field of the Invention

This present invention relates to a novel educational kit which combines a unitized regenerative fuel cell with a demonstration platform to illustrate the principals of fuel cell use and application.

2. Background

A fuel cell education kit provides valuable exposure to the principals of fuel cell generated electricity to children. Teaching familiarity with, and the benefits of, safe alternative power systems at a young age will provide an on-ramp for youngsters into the future consumer use and industrial development of fuel cell technologies.

SUMMARY OF INVENTION

Accordingly, it is an object of the invention to provide a novel fuel cell educational kit.

It is yet another object of the invention to provide a novel wind-up fuel cell powered educational kit.

It is yet another object of the invention to provide a novel solar-cell charged fuel cell powered educational kit.

It is yet another object of the invention to provide a novel wind charged fuel cell educational kit.

It is yet another object of the invention to provide a novel A/C current charged fuel cell educational kit.

It is yet another object of the invention to provide a novel battery charged fuel cell educational kit.

It is yet another object of the invention to provide a novel fuel cell educational kit with a pressure activated charging switch rely.

It is yet another object of the invention to provide a novel fuel cell educational kit with a burst disk safety device.

It is yet another object of the invention to provide a novel fuel cell educational kit with a pressure sensitive internal monitor to limit charging to a predetermined psi.

It is yet another object of the invention to provide a novel fuel cell educational kit with a pressure resistant casing to both pressurize the catalyzing event and prevent escaper of the gases produced thereby.

It is yet another object of the invention to provide a novel fuel Cell educational kit with safety case features to allow for reasonable classroom accidents and drops.

The features of the invention believed to be novel are set forth with particularity in the appended claims. The invention itself, however, both as to configuration, and method of operation, and the advantages thereof, may be best understood by reference to the following descriptions taken in conjunction with the accompanying drawings.

MODES FOR CARRYING OUT THE INVENTION

Figure 1A:
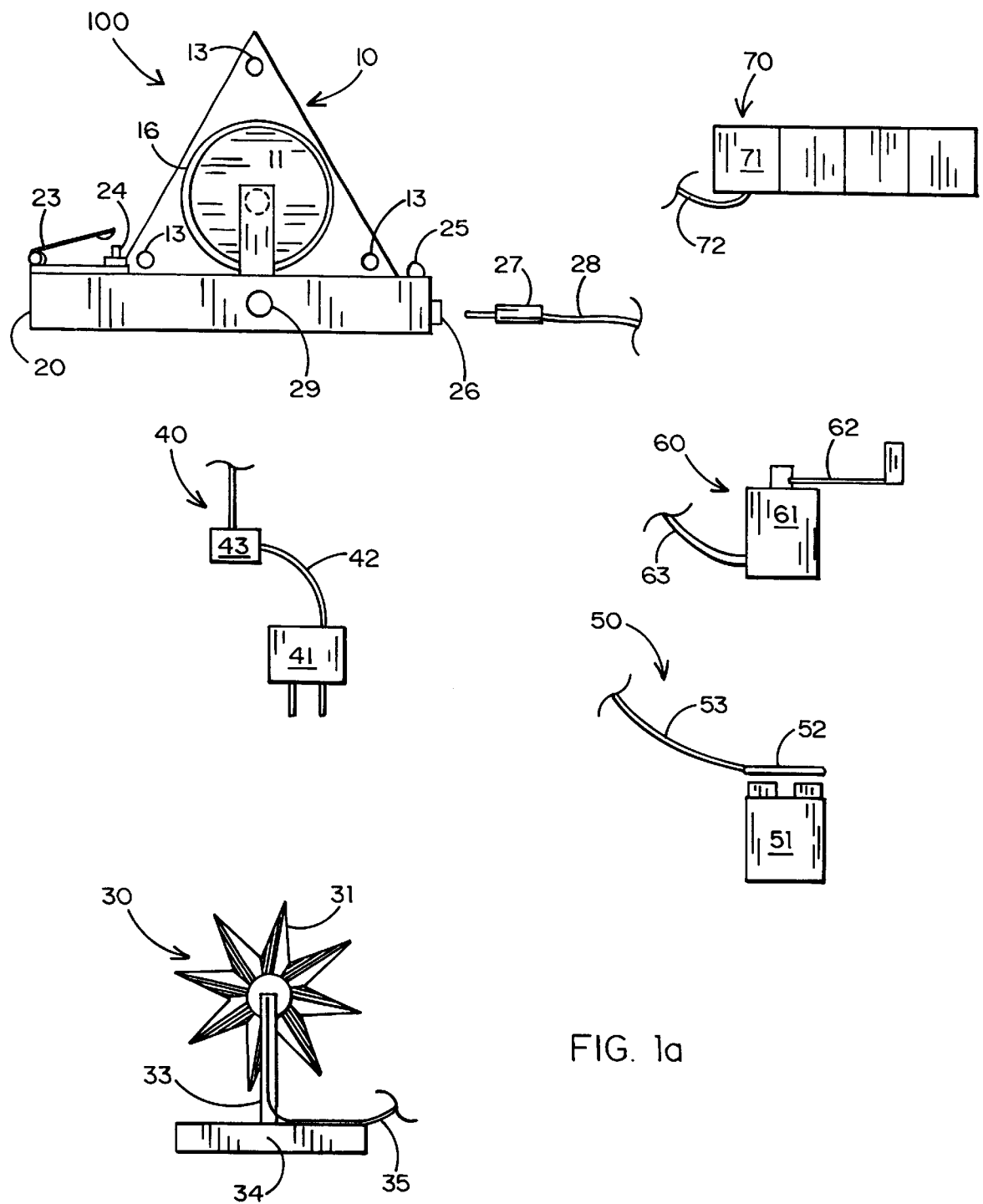
FIG. 1A illustrates a component view of the fuel cell educational kit.

Referring now to the drawings, there illustrated in FIG. 1 there is illustrated a component view of the fuel cell learning kit generally designated 100.

The fuel cell 10, sits in the demonstration base 20. The fuel cell 10, in this preferred embodiment is a regenerative fuel cell converting water into hydrogen and oxygen during a charging cycle and reversing the process during discharge. A proton exchange membrane "PEM" 11 drives the process.

Within a pressure resistant casing 12 formed of two mirror halves, a PEM 11 is secured. The casing is held together with a series of machine nuts and bolts 13 a anode and cathode connector 14 and 15 (not shown in this figure) extend through the casing 12 and provide a connection for charging or discharging the fuel cell 10. A rubber "O" ring 16 provides a seal between the halves of the casing 11.

To demonstrate the fuel cell 10, it is placed in the demonstration base 20 which consists of a bench 21 from which an anode contact 22 and a cathode contact (not shown) arise and are of a size and shape to allow the removable mounting of the fuel cell 10. A spring loaded, contact switch 23 is provided whereby the user must press against the spring to make contact thereby conductively connecting to the momentary switch 24. When the circuit is completed an indicator light 25 illuminates.

A plethora of charging devices may be used with the demonstration base 20 and connect to the circuit via the plug-in jack 26. A charging plug 27 with a conductive line 28 mates with the plug-in jack 26 to attach the charging device of choice. Additionally, an array of demonstration devices, such as lights and fan motors may be connected to the demonstrate the fuel cell 10, via a D.C. output jack 29.

A wind mill 30 system with a fan blade 31 attached to a small generator magnet/coil type 32 is supported by a vertical support 33 from a weighted base 34. The small generator magnet/coil type 32 connect to the conductive line 28 via its own wire lead 35.

An A/C 40 system with a wall plug 41 wire line 42 a low voltage D/C converter connect to the conductive line 28 via its own wire line 42.

A direct D/C 50 system with a battery 51 a battery contact 52 and a wire line 53 connect to the conductive line 28 via its own wire line 53.

A hand crank system 60 with a small generator magnet/coil type 61 and a hand crank 62 connect to the conductive line 28 via its own wire line 63.

A photo-voltaic system 70 with one or more photo-voltaic cells 71 linked to the conductive line 28 via its own wire line 63.

Figure 1B:
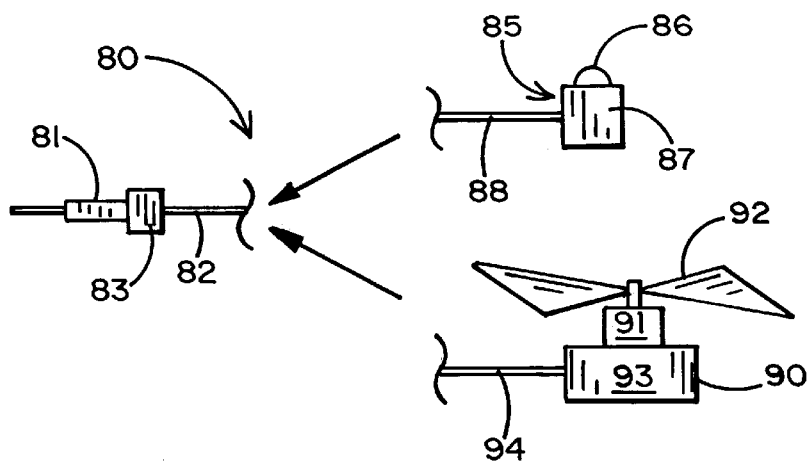
FIG. 1B illustrates a second component view of the fuel cell educational kit.

Referring now to FIG. 1B there is illustrated a second component view of the fuel cell educational kit, generally designated 80.

The D.C. plug-in jack 81 is attached at a first end to a lead wire 82, current limiting and conserving circuitry may also be placed inline 83. A LED module 85 comprising a LED 86, a demonstration base 87 and a connective lead 88 which attaches to the lead wire 82 may be used to demonstrate the electricity generated by discharging the fuel cell 10.

A second demonstration of discharging the fuel cell 10 may be accomplished by placing a small electric motor 91, with a propeller 92, into in a base 93 and connecting it to the lead wire 82.

Figure 2:
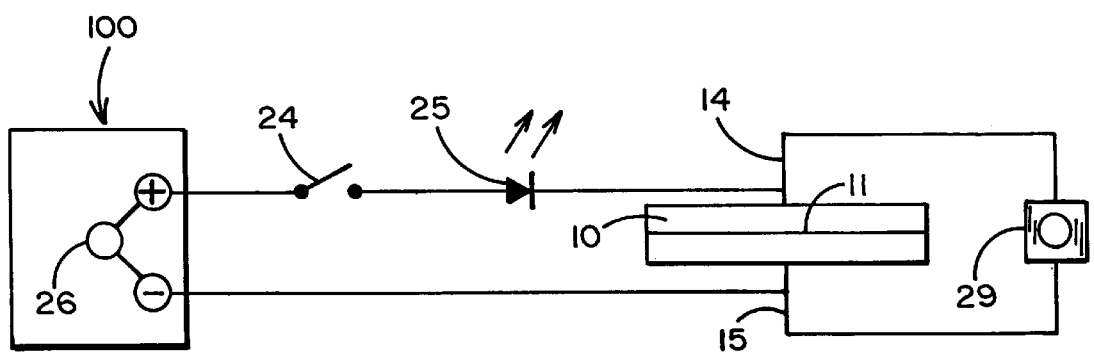
FIG. 2 illustrates a schematic view of the fuel cell educational kit.

Referring now to FIG. 2 there is shown a schematic view of the fuel cell educational kit, generally designated 100.

The fuel cell's PEM 110 is charged via an electrical input device which mates with the plug-in; jack 26. A circuit is completed, and charging may occur by closing the momentary switch 24 which also switches the indicator light 25. Current passes to the fuel cell 10 via the anode and cathode connectors 14 & 15.

To Discharge the fuel cell 10 current passes to the D.C. output jack 29 and into the attached electrical consuming peripheral (not shown).

Figure 3:
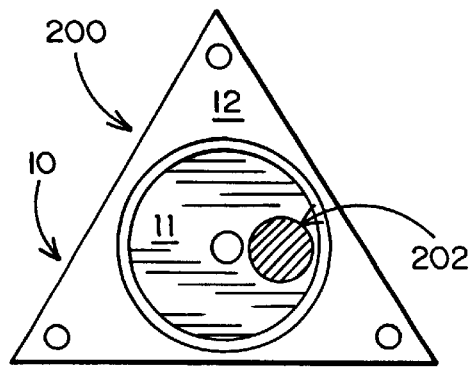
FIG. 3 illustrates an alternate embodiment of the fuel cell used in the learning kit.

Referring now to FIG. 3 there is illustrated an alternate embodiment of the fuel cell used in the learning kit, generally designated 200.

The fuel cell basic structure is that of FIG. 1. Formed as part of the pressure resistant casing 12 is a pre-determined weak spot "burst disk" 201 which will cause a controlled failure of the pressure casing should the internal pressure exceed a pre-determined maximum p.s.i. Covering the "burst disk" 201 is a hydrogen scavenging cap 202 which will catalyze any hydrogen gas which escapes the fuel cell 10, during a controlled burst.

Figure 4A:
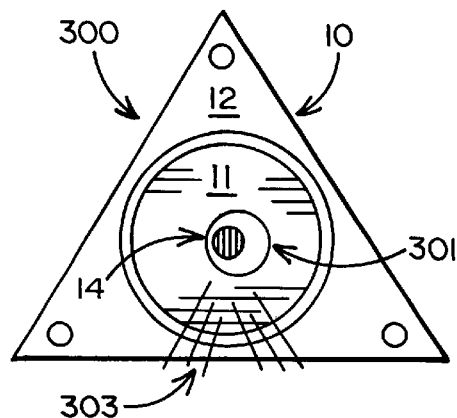
FIG. 4A illustrates a second alternate embodiment of the fuel cell used in the learning kit.
Figure 4B:
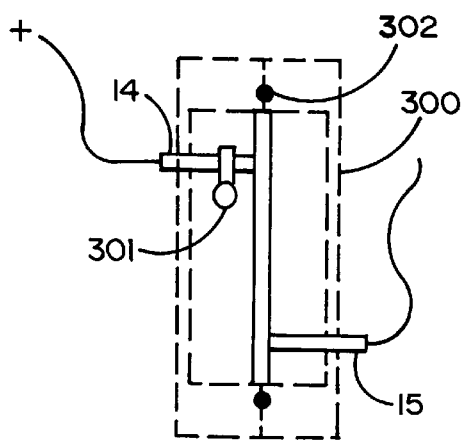
FIG. 4B illustrates a cut-away internal view of the fuel cell of FIG. 4A.
Figure 4C:
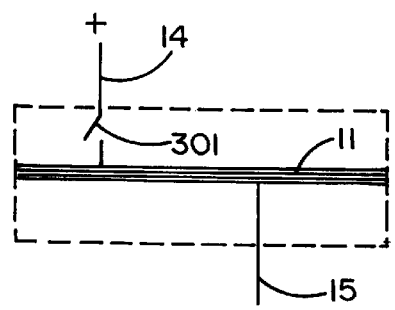
FIG. 4C illustrates a schematic view of the fuel cell of FIG. 4A.

Referring now to FIGS. 4A, 4B and 4C there is illustrated a second alternate embodiment of the fuel cell used in the learning kit, generally designated 300, a cut-away view and a schematic view.

The fuel cell basic structure is that of FIG. 1. Affixed within the pressure resistant casing 12 is an electronic pressure switch 301 which will interrupt the connection of the anode 14 to the PEM 11, should the internal pressure exceed a pre-determined maximum p.s.i.

A redundant pressure control device is formed by creating a non-homogeneous region 303 of the pressure resistant casing 12 in proximity to the "O" ring 16 whereby if the internal pressure of the fuel cell exceeds a pre-determined maximum p.s.i. the "O" ring will leak at the non-homogeneous region 303.

Figure 5:
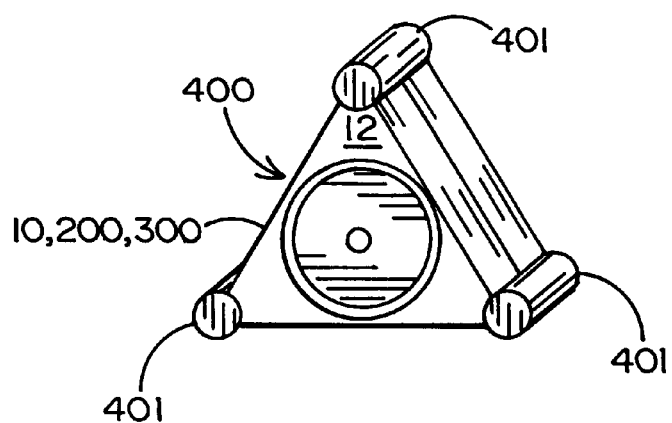
FIG. 5 illustrates a third alternate embodiment of the fuel cell used in the learning kit.
Figure 6:
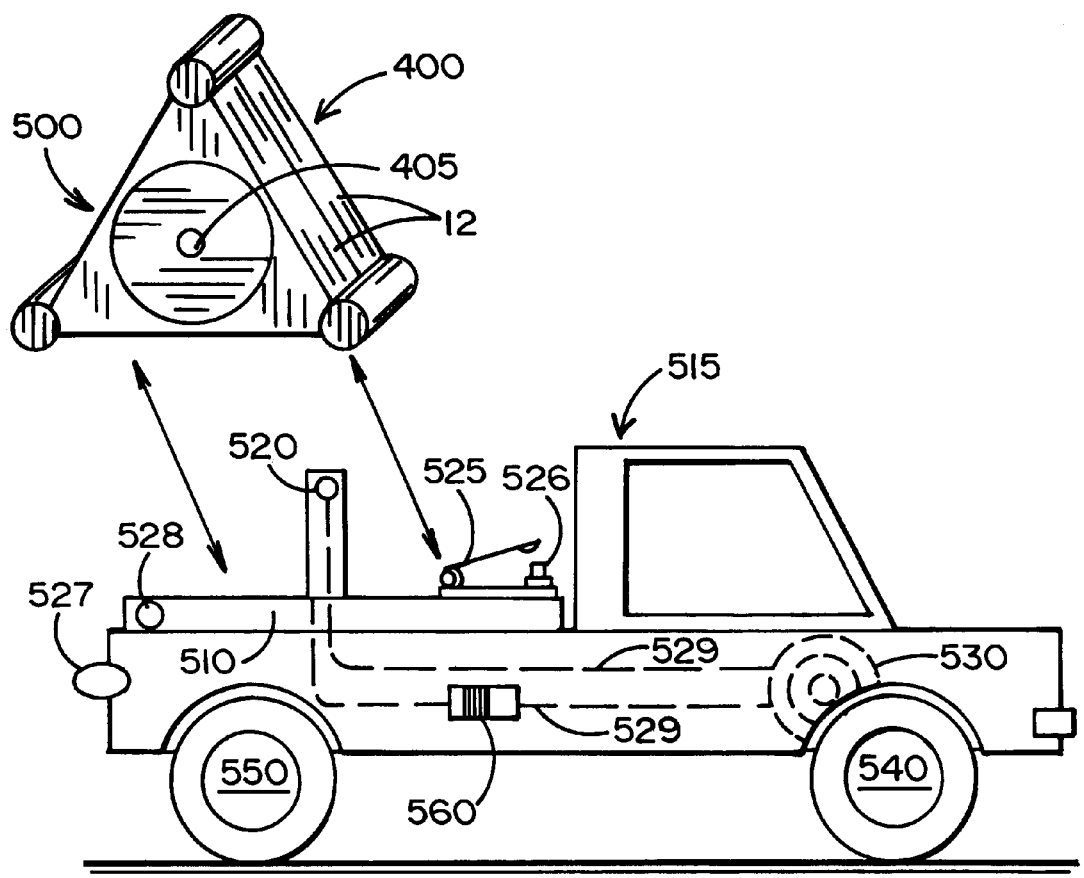
FIG. 6 illustrates an alternate embodiment of the fuel cell and demonstration base used in the learning kit.

Referring now to FIG. 5 there is illustrated a third alternate embodiment of the fuel cell used in the learning kit, generally designated 400. The fuel cell basic structure is that of FIG. 1. Anticipated use of the learning kit by children and in a classroom environment indicates that drop-worthiness of the fuel cell 400 is essential. Material choices such as a poly-carbonate are useful in this regard to provide a resistant casing. In this embodiment rubber-like bumpers 401 are added to the corners of the fuel cell 400 to absorb shock and dropping.

Referring now to FIG. 5 there is illustrated an alternate embodiment of the fuel cell and demonstration base used in the learning kit, generally designated 500.

The fuel cell 400, sits in the demonstration base 510. The fuel cell 400, in this embodiment is a regenerative fuel cell converting water into hydrogen and oxygen during a charging cycle and reversing the process during discharge. A proton exchange membrane "PEM" 11 drives the process.

Within a pressure resistant casing 12 formed of two mirror halves, a PEM 11 is secured. An anode and cathode connector 14, and 15 (not shown in this figure) extend through the casing 12 and provide a connection for charging or discharging the fuel cell 400. A rubber "O" ring 16 provides a seal between the halves of the casing 11.

To demonstrate the fuel cell 400, it is placed in the demonstration base 510 which is mounted in a 515. The anode connector 14 mates with conductive power-in mounts 520 (the cathode connector and its mount are not shown in this illustration). A spring loaded, contact switch 525 is provided whereby the user must press against the spring to make contact thereby conductively connecting to the momentary switch 526. When the circuit is completed an indicator light 527 illuminates.

A plethora of charging devices may be used with the demonstration base 20 and connect to the circuit via the plug-in jack 528. To demonstrate the fuel cell 400 a series of conductive leads 529 connect to a small electric motor 530 which turns the front wheels 540 of the truck 515. When the "on/off" switch 531 is engaged the electric motor 530 operates the front 540 and back wheels 550 turn and the truck body 515 moves.

Since certain changes may be made in the above apparatus without departing from the scope of the invention herein involved, it is intended that all matter contained in the above description, as shown in the accompanying drawing, shall be interpreted in an illustrative, and not a limiting sense.

What is claimed is:

1. A regenerative educational fuel cell comprising:
   (a) a fuel cell learning kit formed of a fuel cell comprising:
      (1) a pressure rated casing wherein a physical pressure relief is incorporated in said pressure rated casing;
      (2) a catalyzed proton exchange membrane;
      (3) a conductive anode and cathode conductively attached to said catalyzed proton exchange membrane; and,
      (4) a cathode and an anode lead extending through said casing, the fuel cell learning kit further comprising:
   (b) a means for charging said fuel cell; and,
   (c) a means for discharging said fuel cell.

2. The regenerative fuel cell learning kit according to claim 1, further comprising a LED in line with the charging circuit whereby during charging of said fuel cell, said LED lights up.

3. The regenerative fuel cell learning kit according to claim 1, further comprising a momentary switch which must be depressed during the charging of said fuel cell.

4. The regenerative fuel cell learning kit according to claim 1, further comprising a locking "on/off" switch for the discharging circuit of said fuel cell.

5. The regenerative fuel cell learning kit according to claim 1, wherein said casing is comprised of two mirror halves and said pressure relief means is a deformable "O"-ring placed between each of said two halves which is rated to leak at a pressure less than the burst pressure of said casing.

6. The regenerative fuel cell learning kit according to claim 1, wherein said casing is comprised of two mirror halves and said pressure relief means is a selectively thinned area of said casing, over the hydrogen storing half of the fuel cell, which is rated to leak at a pressure less than the burst pressure of said casing.

7. The regenerative fuel cell learning kit according to claim 6, further comprising a hydrogen catalyzing substrate affixed above said selectively thinned area.

8. The regenerative fuel cell learning kit according to claim 1, further comprising a mechanical pressure switch which interrupts charging should the internal pressure of said fuel cell pass a pre-determined limit.

9. The regenerative fuel cell learning kit according to claim 1, further comprising a electronic pressure switch which interrupts charging should the internal pressure of said fuel cell pass a pre-determined limit.

10. The regenerative fuel cell learning kit according to claim 1, wherein said charging means is selected from the group consisting of photo-voltaic arrays, wind turbines, batteries, mechanical wind-up coil generators, and A/C.

11. The regenerative fuel cell learning kit according to claim 1, wherein said discharging means is selected from the group consisting of electric motors, voltmeters, light-bulbs, and LED.

12. A regenerative educational fuel cell comprising:
 (a) a fuel cell learning kit formed of a fuel cell comprising:
  (1) a pressure rated casing wherein a physical pressure relief is incorporated in said pressure rated casing;
  (2) a catalyzed proton exchange membrane;
  (3) a conductive anode and cathode conductively attached to said catalyzed proton exchange membrane; and,
  (4) a cathode and an anode lead extending through said casing, the fuel cell learning kit further comprising:
 (b) a base into which said fuel cell is mounted;
 (c) anode and cathode latches formed as part of said base, whereby inserting said fuel cell, into said base, conductively mates said anode and said cathode with said latches;
 (b) a means for charging said fuel cell; and,
 (c) a means for discharging said fuel cell.

13. The regenerative fuel cell learning kit according to claim 12, wherein said base is in the shape of a toy truck and said discharging means is an electric motor affixed to a set of wheels on said toy truck, whereby discharging of said fuel cell causes said wheels to rotate.

14. The regenerative fuel cell learning kit according to claim 12, further comprising one or more current-out jacks whereby properly electrical measuring and utilizing devices may be attached to and powered by said fuel cell.

15. The regenerative fuel cell learning kit according to claim 12, wherein said base is in the shape of a toy boat and said discharging means is an electric motor affixed to a propeller whereby discharging of said fuel cell causes said toy boat to move.

* * * * *